March 31, 1970 K. JÖNS ET AL 3,503,681
ILLUMINATING DEVICE FOR REPRODUCTION PURPOSES
Filed Dec. 22, 1966 3 Sheets-Sheet 1

INVENTORS
Kurt Jons
Gerhard Marx
BY

INVENTORS
Kurt Jons
Gerhard Marx

United States Patent Office 3,503,681
Patented Mar. 31, 1970

3,503,681
ILLUMINATING DEVICE FOR REPRODUCTION
PURPOSES
Kurt Jöns, Wiesbaden-Biebrich, and Gerhard Marx,
Wiesbaden-Kastel, Germany, assignors to Kalle
Aktiengesellschaft, Wiesbaden-Biebrich, Germany,
a corporation of Germany
Filed Dec. 22, 1966, Ser. No. 603,837
Claims priority, application Germany, Dec. 22, 1965,
K 57,981
Int. Cl. G03b 27/02
U.S. Cl. 355—78         22 Claims

ABSTRACT OF THE DISCLOSURE

Apparatus is provided for reproduction purposes to obtain approximately parallel rays of light through a master to a copy sheet to prevent objectionable rays of light passing under the image portions of the master to obtain good copies with a resolution of the order of 180 lines per mm. The apparatus includes a source of light with a transparent support for the master and the copy sheet spaced from the source of light and a plurality of wedge shaped elements having an included angle of between 5 and 35 degrees arranged with their bases adjacent the source of light and there sharp edges adjacent the support with the central planes of the wedge shaped elements extending substantially perpendicularly to the light source and to the transparent support with the wedge shaped elements being closely spaced so a ray of light passing on one side of the base of one wedge and past the sharp edge of the adjacent wedge shaped element adjacent said one side will intersect the transparent support at an angle between 5 and 40 degrees to the vertical with the wedge shaped elements having their surfaces strongly reflective so that other rays striking the reflective surfaces will be reflected through the transparent support at an angle between 5 and 40 degrees to the vertical.

---

Figure 1A:
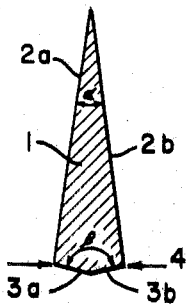

The present invention is concerned with an illuminating device emitting light at a definitely adjustable angle of aperture. It is preferably used with laminar sources of radiation and serves primarily for contact exposure in the reproduction of transparent originals. It is particularly suitable for use in photocopying machines when copies from originals with fine details are to be produced in a continuous process.

Reproductions from texts and drawings on transparent supports, i.e., so-called photocopyable originals or masters, are normally made by the contact process. The material or master to be reproduced is placed with its back onto the light-sensitive layer of a suitable reproduction material copy sheet and exposed in this position. Exposure is normally effected from a light source through a transparent surface such as a plane glass plate or a glass cylinder. The side of the original or master with the writing or printing thereon faces the light source. The light rays pass through the transparent support and the original and strike the reproduction material underneath, with the exception of the areas under the writing on the original. These areas, however, are also affected by light rays striking at an oblique angle of incidence, thus causing a blurring of the letters or symbols produced on the copy. In the case of very fine lines, it may even happen that these do not appear at all on the copy due to this undercutting." This undesirable effect occurs in particular when elongated tubular lamps are used. It may be substantially suppressed by copying layer to layer, i.e., bringing the writing on the original in direct contact with the light-sensitive layer during the copying process.

Mirror images are thus produced, so that the process of having the writing on the original in contact with the photosensitive layer can be applied only in special cases, e.g., when the reproduction material or copy sheet used is transparent. In this case, the writing on the copy may be read from the back, i.e., through the support.

This is the case, e.g., when copies are produced from microfilms. Normally, transparent silver film negatives are transferred onto likewise transparent diazotype films. But even in this case, undercutting and irradiation may occur and, as a consequence thereof, loss of reproduction quality, by light rays having an oblique angle of incidence may occur. This is due to the fact that the thickness of the reproduction layers is of the order of the letters to be reproduced.

If exposure is effected with parallel light rays, the quality of reproduction is adequate, as can be proved by means of suitable optical means already known. Satisfactory results are still obtainable when the angle of incidence of the light deviates from the normal by up to 40°. At an angle of incidence of 10° to 20° to the normal, reproductions of a quality are obtained which differs only slightly from that obtainable by means of parallel light rays and thus satisfies practical requirements. The maximum resolution of commercial silver films could be ascertaned up to about 180 lines per mm. However, to achieve this resolution, high quality optical instruments are necessary. Although it seems that a principal limit is not reached at this resolution, it is presumably the upper limit for the resolution to be obtained in practice. The above mentioned permissible deviation of the rays from the normal refers to a resolution in this range.

However, the optical devices used in the above mentioned tests are too expensive and too susceptible to trouble to be used in technical reproduction apparatus. Therefore, the problem which the present invention sets out to solve was to provide an illuminating device which can be used for making reproductions, particularly in a continuous reproduction process, and which emits light that is sufficiently parallel. Such a device would be preferably used in photocopying machines, and its construction should, if possible, not differ from that of illuminating devices hitherto used in such photocopying machnes. It must be added that it is not necessary to avoid stray radiation of minor intensity, since, principally, it is always possible to use high-contrast material which is practically unaffected, or only slightly affected, by rays of lower intensity.

DAS (German published patent application) 1,145,016 describes an illuminating device for photocopying apparatus, which contains a tubular lamp positioned within a transparent cylinder and surrounded by a plurality of plates which are disposed at an axial distance from one another and have a matte black surface. Oblique rays are absorbed by the matte black surfaces of the vertical plates to that they cannot reach the reproduction material and cause irradiation. The device has, however, certain disadvantages. Thus, the vertical plates throw a shadow which becomes visible on the copy in the form of underexposed longitudinal streaks. Further, the batte black plates absorb such an amount of incident radiation energy that it is inevitable for such a device to have a much lower reproduction speed than a device having no such plates. This refers in particular to plates which are mounted at an acute angle with respect to the axis of the tubular lamp, but these, on the other hand, do not lead to the formation of streaks. However, it is difficult to find a matte black material which sufficiently absorbs ultra-violet rays and retains this property over a long period of time under constant thermal stress. Most materials reflect ultra-violet rays more or less strongly so that undercutting occurs nevertheless. The prior art device described may be useful for visible light, if the disadvantages mentioned above are put up with. Of course, a suitably modified device of this kind may also be used with plane illuminating surfaces, i.e., so-called illuminated printing frames with strongly diffusing glass plates.

The present application is based on the idea of replacing the light-absorbing vertical separating plates in the space between light-source and support for the reproduction material by wedges having reflecting surfaces of a nature such that light which strikes the wedge surfaces at an acute angle is erected and thereby rendered generally parallel and generally normal to the master and the copy sheet.

The present invention solves this problem by means of an illuminating device comprising, in known manner, a light source with a transparent support for the material to be reproduced, e.g., a plane glass plate or a glass cylinder, at a desired distance from the light source, and a plurality of upright, separating elements which are vertically disposed between the light source and the support, if desired in a recurrent sequence, and serve to influence the light emitted by the light source at an angle. The separating elements, in the following called "laminae" are characterized in that they have a wedge shape having a cross section shape and an isosceles, acute-angled triangle and that their sharp edges are directed toward the transparent support. The distance from one wedge to another is such that a straight line which touches the apex of one wedge lamina as well as the lateral edge at the base of a neighboring wedge lamina intersects the supporting surface at an angle of 5 to 40° with respect to the vertical edge and that the surfaces of the wedge laminae are strongly reflecting.

The light emitted by the lamp at an acute angle is reflected by the laminae and erected toward the normal or perpendicular to the master and the copy sheet. Thus, it can no longer objectionably undercut the letters and, moreover, the reflection toward the normal adds to the intensity of the normal light rays. Particularly favorable results are obtained when the laminae have the shape of an isosceles, acute-angled triangle, the acute interior angle of which is between 5 and 35°. With laminae of the described triangular shape, part of the light striking the base is lost. In a preferred embodiment of the invention, the wedge laminae have a cross section in the form of an elongated kite-shaped quadrilateral with the sharply acute angle of 5 to 35° extending toward the transparent support, the master, and copy sheet with the opposite blunt obtuse angle of 135 to 179° extending toward the light source. When such quadrilateral cross section laminae are used, a considerable proportion of the light striking the bases may be passed through the gaps between the laminae and out of the device by means of mirrors mounted in suitable positions behind the light source.

As already stated, the device of the invention may be of a plane or cylindrical construction although constructions of other geometrical shapes are possible.

Preferably, the width of the laminae should be such that they almost fill the space between the lamp and the support, i.e., gaps 2 to 20 mm. wide should separate them from the light source as well as from the support. The width of the laminae may also be less, but may result in annoying diffusion and diffraction phenomena which are not observed when wider laminae are used.

Figure 1B:
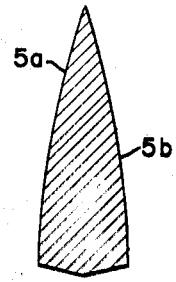
Figure 1C:
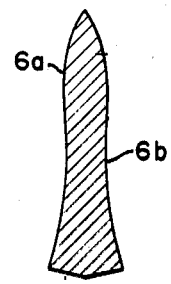
Figure 2:
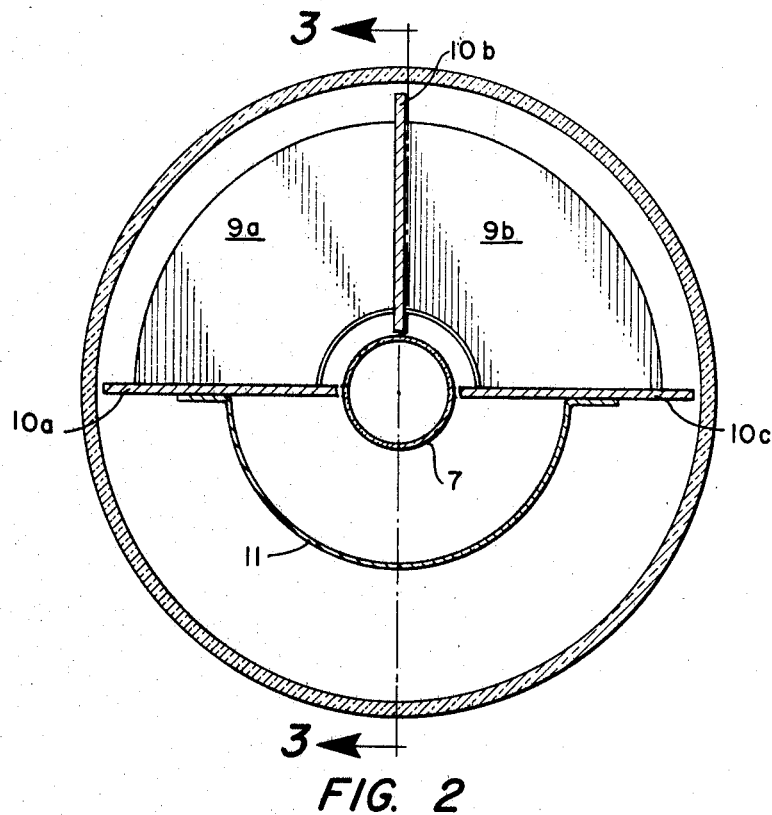
Figure 3:
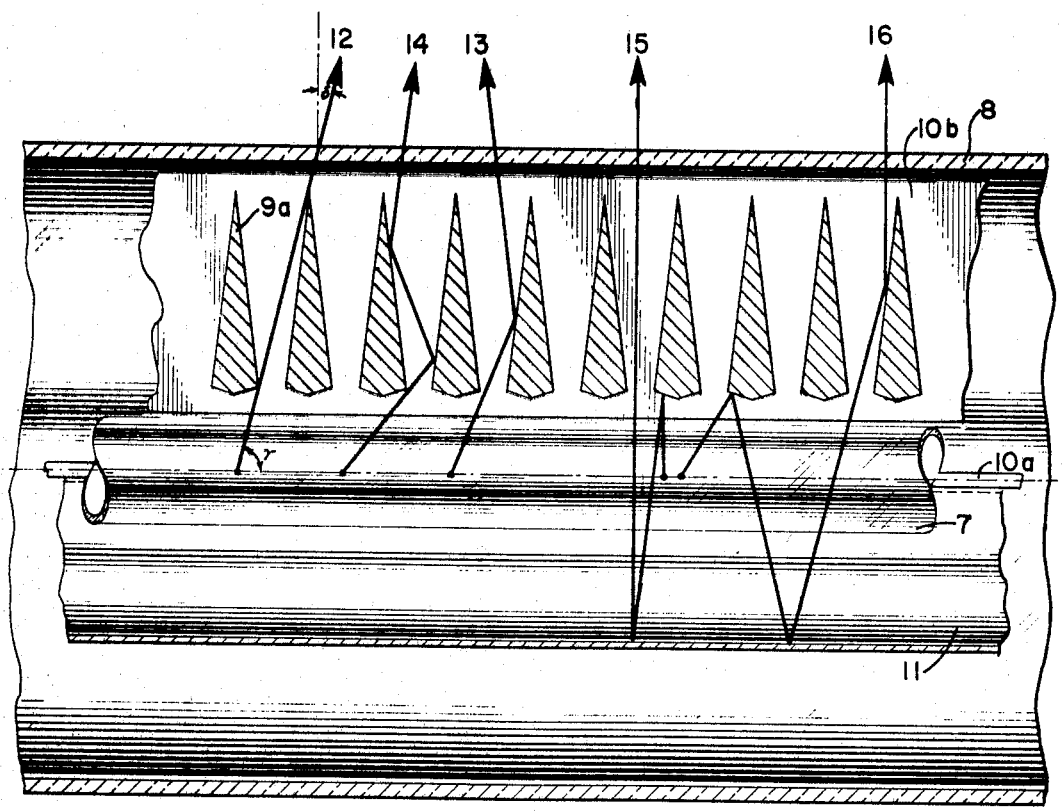
Figure 4:
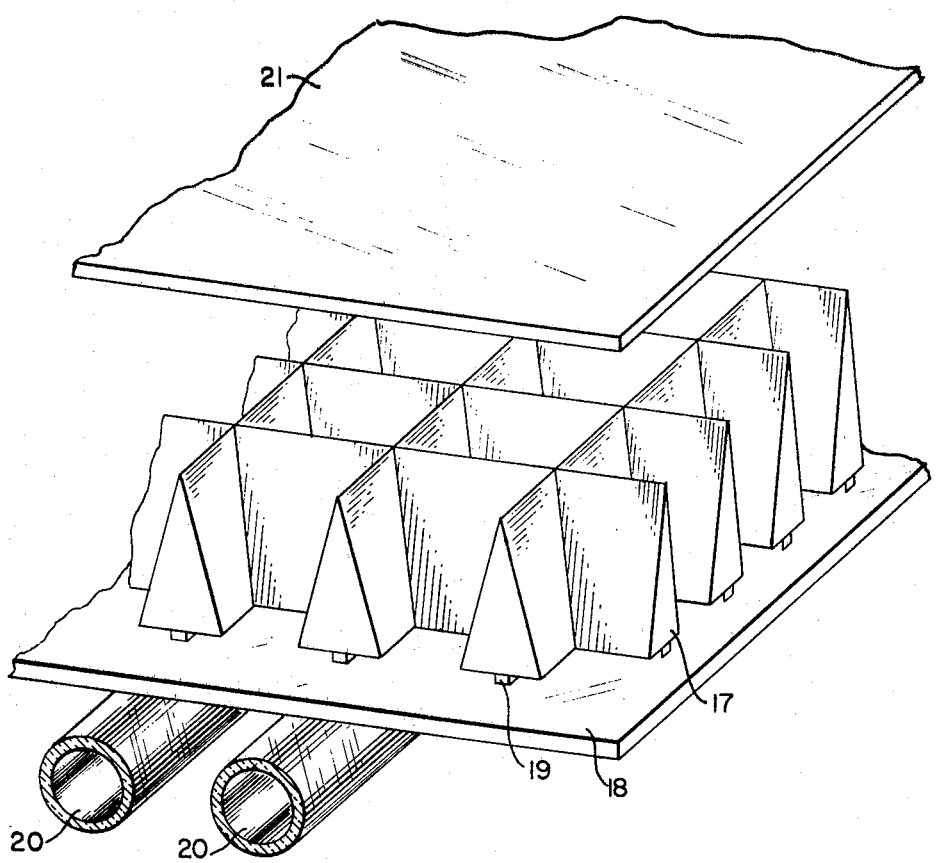

FIGS. 1a, 1b, and 1c show cross-sections of three different types of wedge shaped laminae; FIG. 2 is a cross-section through a preferred embodiment of the illuminating device and transparent support according to the present invention; FIG. 3 is a longitudinal section along line 3—3 of the device shown in FIG. 2; FIG. 4 is a specific arrangement of the laminae in a plane embodiment of the invention.

FIG. 1a shows the preferred basic cross-section of a lamina 1 of solid material which may be of metal or a thermoplastic material formed by injection molding. The two long lateral surfaces 2a and 2b define acute dihedral angle $\alpha$ which is between 5 and 35°. The higher the degree of resolution desired of the copy, the sharper this acute angle must be. Wide sharp edged wedges or laminae are preferably used to avoid a great thickness at the base 4 which otherwise would cover too much of the radiation source. The plunt edge formed by highly polished surfaces 3a and 3b have the effect that the laminae cast no shadow and that the light striking these surfaces 3a, 3b is also reflected out of the device. The dihedral angle $\beta$ confined by the surfaces 3a and 3b may be of any size within the limits stated, no essential change of the light intensity in the zone of illumination being noticed. It is, however, advisable to select an angle within the range of 170 and 179°, since in this range illumination is most uniform and a mirror which may be mounted behind the light source is most easily adapted.

The large lateral surfaces of the laminae are not necessarily straight to obtain the desired effect. They may be three-dimensionally curved, e.g., convex, such as the surfaces 5a and 5b in FIG. 1b. If the laminae are very close to one another because a very high degree of resolution is desired, an S-shaped boundary of the laminae, such as the one shown at 6a and 6b, in FIG. 1c, has also proved advantageous.

An arrangement of the individual structural elements of the device according to the invention such as the one shown in the embodiment illustrated by FIG. 2 and FIG. 3 is preferably used. The figures are restricted to the essential characteristics of the device. Thus, e.g., the elements by means of which the outer, transparent cylinder, normally a glass cylinder, is rotated, are not shown. This is effected in known manner by means of conveyor belts. Further, the lead-in wires for the current supply and the holdings for the tubular lamp are not shown because they correspond to known devices.

If it is desired to reproduce microfilms on diazotype film material, a high-pressure mercury vapor lamp for a source of radiant energy is normally used as the tubular lamp 7, because such lamps emit a large proportion of ultraviolet light. Because of its high radiation intensity, the lamp and is surroundings become hot, and a cooling blower is provided to eliminate heat. The tubular lamp 7 and the other structural elements surrounding it are mounted within a glass cylinder 8. In the embodiment of the invention shown in FIG. 2, the laminae 9 are in the shape of quadrants, two of which (9a and 9b) combine to form a semicircle. They are separated from each other by a full-length vertical wall 10b and bounded by two further walls (10a and 10c). These boundaries serve to intercept the oblique rays which leave the lamp parallel to the laminae, and the stray radiation caused by reflection from the transparent cylinder 8. It is advisable to provide the surfaces of the separating walls with a matte black coating in order to absorb the oblique rays at least partially. Suitably, the number of separating walls is such that, when seen from above, i.e., looking toward the tubular lamp 7, the rectangle between two laminae and two separating walls normal thereto resembles a square. In this case, the angular aperture is about the same for the oblique rays striking the glass cylinder 8 lengthwise and for the oblique rays striking the glass cylinder 8 transversely.

With this arrangement, the rays which strike the separating walls do not contribute to the formation of an image, because they are deleted by absorption. This can be avoided by constructing the separating walls in such a manner that they also have the trriangular or kite-like quadrilateral cross-section according to the invention. A view perpendicular to the tube 7 shows in this case the laminae forming a cross grating, each rectangle forming the outer boundaries of a hollow frustum. It will be appreciated that the same effect may be achieved also with other geometrical arrangements of the laminae, e.g., the honeycomb design of equilateral hexagons has also proved suitable. Other designs are also possible. Care must only be taken that the apertures for the passage of the light do not become too small, because this may lead to irregular illumination and may even cause diffraction effects. The grating-type arrangements of the laminae may be applied with advantage for devices of cylindrical as well as of plane construction.

FIG. 4 described in detail below, shows a plane embodiment of the device according to the invention. The grating-type arrangement is also of advantage from the point of view of manufacture, because the grating may be manufactured in one piece from metal or plastic material by injection molding. Lamina gratings may also be manufactured by cutting from a solid plate or thick-walled cylinder in a suitable milling operation. This method is preferred when the laminae are relatively short and do not fill the whole space between the lamp and the support.

The position of the laminae with respect to the tubular lamp may differ in various ways from the one described above, advantageous results being obtained in some cases. Thus, when long laminae are used in glass cylinders of large diameters, e.g., it has proved advantageous to subdivide the laminae into two or three sectors of the same size and to arrange them in a staggered order. Thus lamina 9a would lie in a plane offset or staggered with respect to lamina 9b in FIGS. 2 and 3. Due to the intensive reflection caused by the thick-walled cylinder of such a device, it is normally difficult to ensure that the density of radiation is uniform over the whole illuminated area, so that over- and under-exposed areas may be the result. This is substantially avoided by the staggered arrangement of the laminae.

In a simple, but also effective arrangement, the individual laminae are replaced by a continuous laminae which winds around the tubular lamp like the coils of helical spring in the form of a spiral and has a cross-section corresponding to that shown in FIG. 3.

FIG. 3 shows several ray paths with simple, double and triple reflection. Ray 12 which leaves the lamp under the angle γ is a direct edge ray which just manages to leave the device unreflected. It enters the reproduction material at an angle of deviation δ to the normal. According to the definition given above, this ray serves for the geometrical construction of the laminae. The erection of an oblique ray by simple reflection is shown at 13. Ray 14 is reflected twice by the long planes of the laminae and thereby erected. Ray 15 is also reflected twice, once by the base surface of a lamina and once by the reflector 11. Ray 16 is reflected three times, once by the base surface of a lamina, once by reflector 11, and once by the long lateral surface of a lamina. In a plane arrangement of the device provided with a mirror at the back, the same reflection conditions prevail.

In a plane arrangement with no reflecting surface beneath the light source, such as shown in FIG. 4, the conditions of reflectance are somewhat different. A cross-grating consisting of laminae 17 having feet 19 is positioned with its feet 19 upon a strongly diffusing glass plate 18 which provides a plane illuminating surface. The distance of the grating from the glass plate is determined by height of the feet 19. Tubular lamps 20 are mounted beneath the glass plate, their light striking the glass plate 18 and being diffused. A master and copy sheet support plate 21 of clear glass is mounted above the grating 17, which serves as the support for the original and the reproduction material. In an arrangement like this, it is sometimes of advantage to provide the bases of the laminae not with reflecting, but with diffusing surfaces. Thus the light striking the bases of the laminae is not reflected altogether vertically, but at least part of it is reflected upon the free areas under the laminae. However, it is more advisable to use laminae with blunt bases, the blunt ends of the wedges thus formed serving like feet 19 as spacers. The laminae grating thus rests on the lower or base edges of the laminae.

Aluminum is preferably used as the material for the laminae, because it can be provided with a highly polished surface relatively easily. For the surface treatment of the aluminum, known chemical or electrochemical processes are preferebly used by which a thin layer of aluminum oxide is formed on the surface. Further, the aluminum oxide layer may be impregnated in known manner with a dyestuff. Thus it may be achieved that certain ranges of the spectrum of radiation emitted by the tubular lamp are not reflected, but absorbed, by the surface of the laminae. This method is of advantage in that, e.g., radiation of spectral ranges in which the originals used absorb insufficiently, may be eliminated by filtration before they strike the original. A better contrast of the copy is the result. Since a large number of aluminum dyes are known, it is not difficult normally to find a suitable dyestuff for a certain range of wave lengths.

As already stated, the laminae may also be manufactured of plastic material, thermoplastic materials suitable for injection molding processes being preferred. Since these plastic materials ordinarily do not have, per se, a highly reflecting surface, they should be made reflective on their surfaces, e.g., by being metallized. The metal layer may be applied by a chemical process or by vacuum deposition. Vacuum deposition of aluminum is preferred, because it strongly reflects the light particularly in the ultraviolet range and may be submitted to the above described dyeing processes. If a particularly strong reflection in the ultraviolet range of rays is desired, a layer of tantalum may also be applied by vacuum deposition.

By means of the device according to the present invention, it is possible to achieve, e.g., a resolution of up to 180 lines per mm. in the reproduction of microfilms. This guarantees a quality of transfer which is more than sufficient for commercial microfilms carrying originals with letters reduced to 1/20 or 1/30 of their normal size. The preferred cylindrical arrangement of the device according to the invention may be used in the customary manner for a continuous reproduction process. Due to the high proportion of light utilized, exceptionally short exposure times and, consequently, a high capacity of the photocopying machines are achieved. Thus, with a photocopying machine in which all constructional elements are processed with the highest accuracy, feed speeds of up to 15 meters per minute were possible for the reproduction material and the material to be reproduced, without impairing the sharpness of reproduction.

Also in the case of enlargement apparatus, the optical lenses of which are adapted to the use of parallel light, a particularly high-intensity device according to the invention could be used with advantage as light source for parallel light.

The illuminating device according to the invention may be used also with advantage for other purposes not mentioned in this connection where collimated light is required.

It will be apparent that changes may be made within the spirit of the invention as defined by the valid scope of the claims.

The embodiments of the invention in which an exclusive property or privilege is claimed are defined as follows:

1. An illuminating apparatus for reproduction purposes to obtain an approximation to parallel rays of radiant energy through a master to a copy sheet comprising an elongated radiant energy source, a radiation transparent support for the master and a radiation sensitive copy sheet positioned at a suitable distance from the radiant energy source, a plurality of wedge-shaped elements arranged in spaced apart side-by-side relation positioned between the radiant energy source and the transparent support and having their sharp edges adjacent the transparent support and their bases adjacent the radiant energy source and extending substantially perpendicularly to the radiant energy source and to the transparent support, the spacing between adjacent wedge-shaped elements being such that a ray of radiant energy corresponding to a line drawn from one side of the base of one wedge past the sharp edge of the wedge adjacent its said one side intersects the transparent support at an angle between 5 and 40 degrees to the vertical, the surface of said wedge elements being strongly reflecting, the wedge-shaped elements extending radially between the elongated source of radiant energy and the transparent support, a reflecting dish having a cross-section of a circular sector disposed along the elongated radiant energy source and the wedge-shaped elements being of sector shape and extending to the reflecting dish forming a circle therewith.

2. The invention according to claim 1 in which the inner dihedral angle of the sharp edges of the wedge-shaped elements is between 5 and 35°.

3. The invention according to claim 1 in which the edges of the wedge-shaped elements are spaced from the light source and from the transparent support approximately 2 to 20 mm.

4. The invention according to claim 1 in which the wedge-shaped elements have a cross-section of a kite-shaped quadrilateral with the obtuse angle opposite the sharp edge being between 135 and 179°.

5. The invention according to claim 4 in which the wedge-shaped elements have curved surfaces adjacent the sharp edge.

6. The invention according to claim 5 in which the curved surfaces have an S-shape.

7. The invention according to claim 1 in which the source of radiant energy is a tubular lamp and the transparent support is a transparent cylinder surrounding said tubular lamp and the wedge-shaped elements extend radially between the tubular lamp and the transparent support.

8. An illuminating apparatus for reproduction purposes to obtain an approximation to parallel rays of radiant energy through a master to a copy sheet comprising a radiant energy source, a radiation transparent support for the master and a radiation sensitive copy sheet positioned at a suitable distance from the radiant energy source, a plurality of wedge-shaped elements arranged in spaced apart side-by-side relation and having their sharp edges adjacent the transparent support and their bases adjacent the radiant energy source and extending substantially perpendicularly to the radiant energy source and to the transparent support, the spacing between adjacent wedge-shaped elements being such that a ray of radiant energy corresponding to a line drawn from one side of the base of one wedge past the sharp edge of the wedge adjacent its said one side intersects the transparent support at an angle between 5 and 40 degrees to the vertical, the surface of said wedge elements being strongly reflecting, the source of radiant energy being a tubular lamp and the transparent support being a transparent cylinder surrounding said tubular lamp with the wedge-shaped elements extending radially between the tubular lamp and the transparent support, a reflecting dish having the cross-section of a circular sector being disposed along the tubular lamp and the wedge-shaped elements being of sector shape and extending to the reflecting dish forming a full circle therewith.

9. The invention according to claim 8 in which the wedge-shaped elements are arranged in at least two groups of sectors and one group of sectors is staggered with respect to an adjacent group.

10. The invention according to claim 9 in which supporting wall means extend radially between the tubular lamp and the transparent cylinder and longitudinally thereof providing radiation control surfaces and wedge element supporting means.

11. The invention according to claim 7 in which the wedge-shaped elements are in the form of a spiral extending around a substantial portion of the elongated source of radiant energy.

12. The invention according to claim 1 in which the wedge-shaped elements form a cross-grating which constitutes a coherent structural element.

13. The invention according to claim 1 in which the wedge-shaped elements are arranged in the form of a honeycomb which constitutes a coherent structure.

14. The invention according to claim 7 in which the wedge-shaped elements are connected to elements extending transversely of said wedges providing a cross-grating honeycomb structure between the elongated source of radiant energy and the transparent cylinder.

15. The invention according to claim 1 in which the transparent support is a plane and the wedge-shaped elements form a cross-grating honeycomb whereby the radiation is guided in all directions.

16. The invention according to claim 1 in which the wedge shaped elements are formed of highly polished aluminum which has been superficially oxidized.

17. The invention according to claim 1 in which the wedge-shaped elements are of plastic material coated by vacuum deposition with an aluminum layer superficially oxidized.

18. The invention according to claim 1 in which the reflecting surface is an oxide layer of aluminum impregnated with a dyestuff which absorbs radiation within a definite range of the spectrum.

19. The invention according to claim 8 in which the wedge-shaped elements are in the form of a continuous spiral.

20. The invention according to claim 10 in which the radially and longitudinally extending supporting wall means is made non-reflective.

21. The invention according to claim 1 in which the width of the wedge-shaped elements is several times greater than the distance between the adjacent edge of the wedge-shaped elements and the radiant energy source and the width of the wedge-shaped elements is several times greater than the distance between the adjacent edge of the wedge-shaped elements and the transparent support.

22. The invention according to claim 1 in which the radiant energy source is a milk glass plate and the wedge-shaped elements effectively confine the radiation emanating from said plate, and wedge-shape partitions extend between the adjacent wedge-shaped element and the surfaces of said wedge-shape partitions are strongly reflecting.

References Cited

UNITED STATES PATENTS

| | | | |
|---|---|---|---|
| 2,817,754 | 12/1957 | Moore | 240—10.66 |
| 2,971,083 | 2/1961 | Phillips et al. | 240—78 |
| 2,990,763 | 7/1961 | Frantz | 95—77.5 |
| 3,217,625 | 11/1965 | Trump | 95—77.5 |
| 3,377,482 | 4/1968 | Podany | 240—103 |

JOHN M. HORAN, Primary Examiner

RICHARD L. MOSES, Assistant Examiner

U.S. Cl. X.R.

240—46.41; 355—104, 110